United States Patent
Kesler (10) Patent No.: US 7,128,475 B2
(45) Date of Patent: Oct. 31, 2006

(54) FIBER OPTIC CONNECTOR

(75) Inventor: James R Kesler, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 10/976,129

(22) Filed: Oct. 28, 2004

(65) Prior Publication Data

US 2006/0093281 A1    May 4, 2006

(51) Int. Cl.
    *G02B 6/42*    (2006.01)
(52) U.S. Cl. .......................................... 385/92; 385/88
(58) Field of Classification Search ............ 385/88–89, 385/92–94
    See application file for complete search history.

(56) References Cited

U.S. PATENT DOCUMENTS

| | | | |
|---|---|---|---|
| 4,114,979 A | 9/1978 | Heldt | |
| RE31,515 E | 2/1984 | Heldt | |
| 4,534,616 A | 8/1985 | Bowen et al. | |
| 4,547,039 A * | 10/1985 | Caron et al. .................. | 385/88 |
| 4,614,402 A | 9/1986 | Caron et al. | |
| 4,645,296 A | 2/1987 | Cattin et al. | |
| 4,676,588 A | 6/1987 | Bowen et al. | |
| 4,741,590 A | 5/1988 | Caron | |
| 4,778,240 A * | 10/1988 | Komatsu ...................... | 385/88 |
| 4,828,509 A | 5/1989 | Vogel | |
| 5,082,378 A | 1/1992 | Muller et al. | |
| 5,117,476 A * | 5/1992 | Yingst et al. .................. | 385/88 |
| 5,123,071 A | 6/1992 | Mulholland et al. | |
| 5,151,961 A * | 9/1992 | Hvezda et al. ................ | 385/60 |
| 5,195,156 A * | 3/1993 | Freeman et al. .............. | 385/92 |
| 5,216,734 A | 6/1993 | Grinderslev | |
| 5,231,685 A * | 7/1993 | Hanzawa et al. ............. | 385/84 |
| 5,259,052 A | 11/1993 | Briggs et al. | |
| 5,259,053 A * | 11/1993 | Schaffer et al. .............. | 385/88 |
| 5,577,145 A | 11/1996 | Musk | |
| 5,577,146 A | 11/1996 | Musk | |
| 5,745,621 A | 4/1998 | Musk | |
| 5,960,136 A | 9/1999 | Shakhman et al. | |
| 6,247,851 B1 * | 6/2001 | Ichihara ........................ | 385/56 |
| 6,341,899 B1 * | 1/2002 | Shirakawa et al. ........... | 385/88 |
| 6,371,661 B1 | 4/2002 | Meadowcroft | |

(Continued)

OTHER PUBLICATIONS

SEL Fiber-Optic Products and Applications by SEL, date unknown.

(Continued)

*Primary Examiner*—Rodney Bovernick
*Assistant Examiner*—Mike Stahl
(74) *Attorney, Agent, or Firm*—Cook, Alex, McFarron, Manzo, Cummings & Mehler, Ltd.

(57) ABSTRACT

Disclosed is a fiber optic connector that includes a rigid housing having a first cavity configured to receive a first optical fiber network element, such as a transmitting or receiving optical unit or subassembly, and a second cavity configured to receive a second optical fiber network element, such as an optical fiber connector. The connector further includes a retaining member for operative engagement with the housing and with one of the optical fiber network elements, at a location intermediate to the ends of the unit to retain the unit at a selected location within the housing. The housing axially aligns the first and second optical fiber network elements such that they are in optical alignment. Further, the retaining member includes a number of extending members for convenient mounting to, for example, a circuit board.

18 Claims, 5 Drawing Sheets

U.S. PATENT DOCUMENTS

| | | |
|---|---|---|
| 6,698,938 B1 | 3/2004 | Ziegler et al. |
| 6,735,371 B1 | 5/2004 | Gregory |
| 2005/0002620 A1* | 1/2005 | Tanaka .................. 385/92 |

OTHER PUBLICATIONS

Low Cost, Miniature Fiber Optic Components with ST, SMA, SC and FC Ports by Agilent Technologies, date unknown.

Fiber Optic Products by Tyco Electronics, revised Jun. 2003.

VCSEL (Vertical Cavity Surface Emitting Laser) from Lasermate. com web site, printed Aug. 2004.

Fiber Optic Connectors from fiber-optics.info web site, printed Aug. 2004.

PicoLight PL-SSx-00-S10-C0 brochure, dated Sep. 2003.

PicoLight SLR-00-S13-C0 brochure, dated Sep. 2003.

PicoLight SSR-00-S13-C0 brochure, dated Sep. 2003.

Fiber Optic Products Catalog by AMP, revised Jun. 2003.

* cited by examiner

FIBER OPTIC CONNECTOR

The present invention generally relates to connectors for use in an optical fiber network. More specifically the present invention relates to a novel connector for connecting optical fiber network elements, such as an optical fiber to a transmitting or receiving optical unit or subassembly.

BACKGROUND

A variety of connectors have been employed in fiber optic networks. Examples of connectors for connecting optical fibers to an optical device may be seen in U.S. Pat. Nos. 4,114,979; 4,534,616; 4,645,296; 4,676,588; 4,741,590; 4,828,509; 5,082,378; 5,123,071; 5,216,734; 5,259,053; 5,577,145; and 5,960,136. Despite much work having been done in developing connectors for joining elements of a fiber optic network, there remains a need for connectors that are easy to assemble, that maintain the optic fiber elements in optical alignment for reliable communication between the elements, that are efficient in space utilization and/or that lend themselves to various applications, including attachment to printed circuit boards if required by the particular application.

SUMMARY OF INVENTION

In accordance with the present invention a fiber optic connector is provided that comprises a rigid housing having a first cavity for receiving a first optical fiber network element, such as a transmitting or receiving optical unit or subassembly, and a second cavity for receiving a second optical fiber network element, such as an optical fiber connector. The connector further includes a retaining member for operative engagement with the housing and with one of the optical fiber network elements, at a location intermediate to the ends of the unit to retain the unit at a selected location within the housing.

In accordance with another aspect of the invention, the housing axially aligns the first and second optical fiber network elements so that they are in optical alignment.

In accordance with a further aspect of the present invention, the retaining member has a plurality of extending members, such as depending feet, for convenient mounting such as on a circuit board or the like. The retaining member may also, when attached to the housing, substantially close the first cavity, enclosing the first optical fiber network element within the first cavity.

In a more specific embodiment of the present invention, the housing includes at least one slot and the retaining member is adapted for insertion into the slot. The retaining member is configured so that when inserted into the slot it will engage the first optical fiber network element, such as a transmitting or receiving optical unit or subassembly, inserted into the first cavity to retain the first optical fiber network element at a selected axial location in the housing. The interior surface of the first cavity may also include a guide surface that engages the first optical fiber network element to assure that the element is inserted in a preselected annular or rotational position. These and other features are set forth in the following detailed description and the accompanying drawings of a preferred embodiment of the present invention.

DETAILED DESCRIPTION

Figure 1:
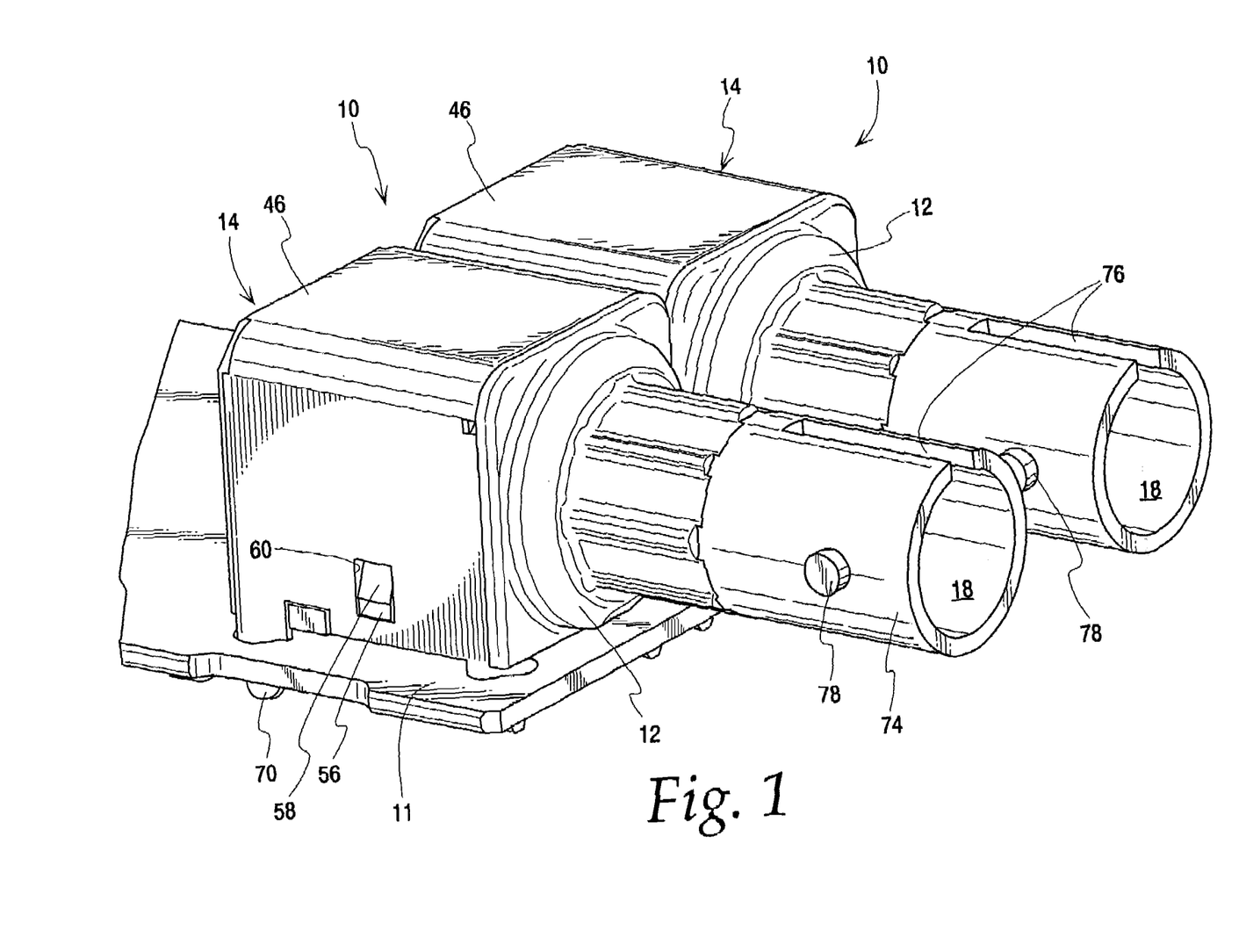
FIG. 1 is a perspective view of two adjacent fiber optic connectors embodying the present invention mounted on a printed circuit board.

As shown in FIG. 1, the present invention is embodied in a fiber optic connector, generally designated 10, for connecting a first optical fiber network element, such as a transmitting or receiving optical unit or subassembly, to a second optical fiber network element, such as an optical fiber or optical fiber connector. The connector assembly 10 is suitable for a variety of applications and mounting arrangements. For purposes of illustration and not limitation, the connector 10 is shown attached to printed circuit board 11, for which it is particularly well adapted, as will be discussed later.

Figure 2:
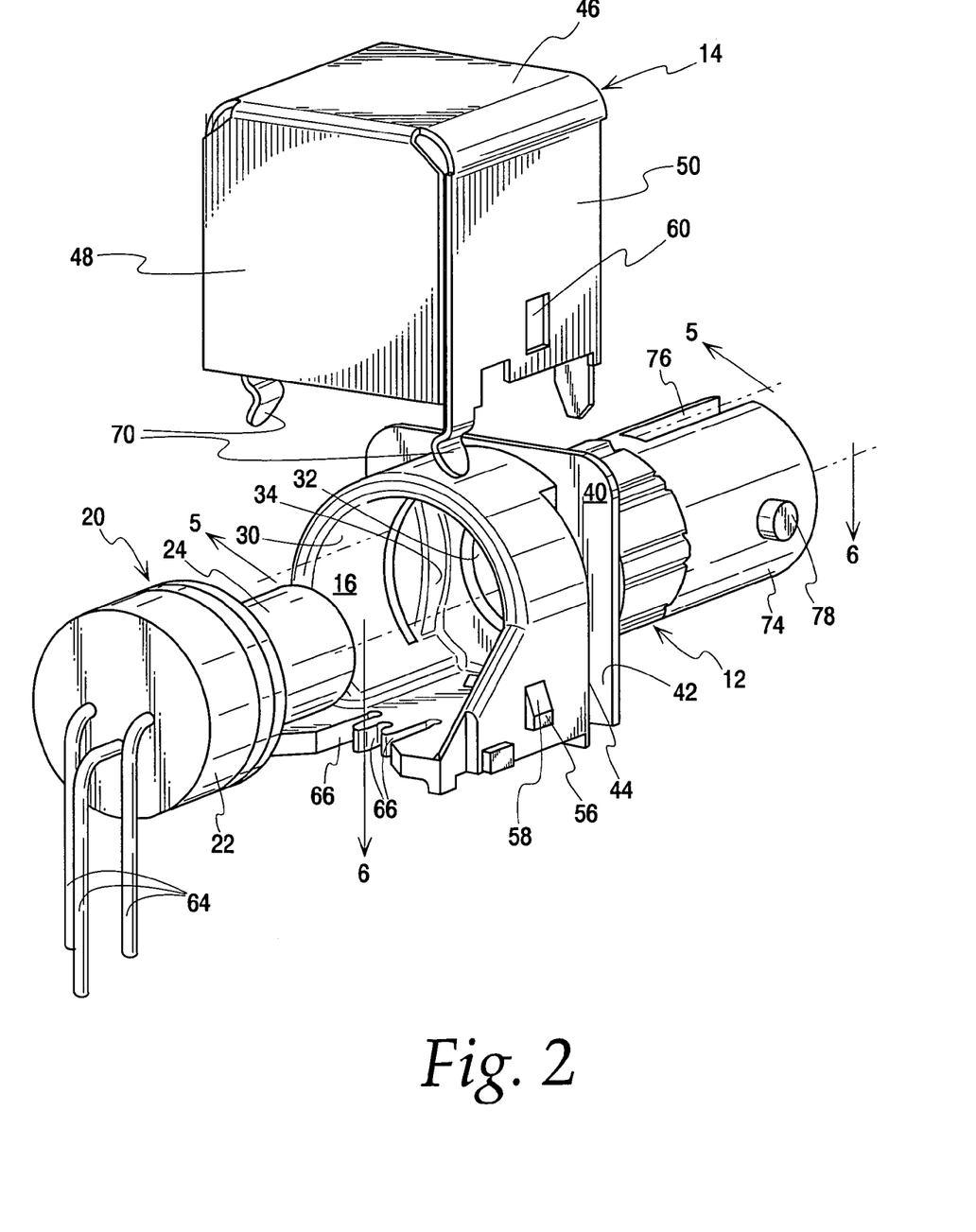
FIG. 2 is an exploded perspective view of a fiber optic connector embodying the present invention and an optical fiber network element in the form of a transmitting or receiving optical subassembly or unit.

FIG. 2 is an exploded view of the connector 10 embodying the present invention, and showing a transmitting or receiving optical unit or subassembly 20. As shown in FIG. 2, the fiber optic connector 10 of the present invention includes a rigid connector housing 12 and a retaining member 14.

The rigid connector housing 12 is preferably made of nonconductive plastic material, such as polycarbonate, which is readily moldable. Other suitable material may also be used, however, including other plastics and even metal, without the departing from the present invention.

The illustrated connector housing 12 has two opposed end cavities, a first end cavity 16 and a second end cavity 18. First end cavity 16 is shaped to receive a first optical fiber network element, such as a transmitting or receiving optical subassembly or unit 20, which may conform to the type SC fiber optic connector standards of the Telecommunications Industry Association. The other or second end cavity 18 is configured to receive a second optical fiber network element, such as an optical fiber connector that may configured, for example, to conform to the type ST fiber optic connector standard of the Telecommunication Industry Association.

For purposes of illustration, the first optical fiber network element is illustrated in the form of transmitting or receiving optical unit or subassembly 20 and may be seen in FIGS. 2, 3, 5 and 6. The illustrated transmitting or receiving optical unit or subassembly includes a base portion 22, from which one or more electrical leads 64 extend, and a generally cylindrical extension 24, which may include light transmitting or receiving means, that is inserted into the first end cavity 16 of connector housing 12. The base portion of the illustrated transmitting or receiving optical unit or subassembly has an annular groove or slot 26 and an alignment flat 28 located on the distal end of the base.

To receive the transmitting or receiving optical unit or subassembly 20, the first end cavity 16 of the connector housing 12 has a generally cylindrical enlarged proximal portion or bore 30 and a generally cylindrical, smaller diameter distal portion or bore 32 that are sized to receive, respectively, the base portion 22 and extension 24 of the transmitting or receiving optical unit or subassembly 20. The bore 30 and 32 are sized in relatively close tolerance to the transmitting or receiving optical unit or subassembly 20 so that it is located in a fixed, radially and axially aligned position when inserted into the first end cavity 16.

The enlarged bore 30 of the first end cavity 16 has a raised flattened surface 34 at a selected annular position for alignment with the alignment flat 28 on the transmitting or receiving unit or subassembly 20. With this feature, the transmitting or receiving optical unit or subassembly 20 can only be inserted fully into the connector housing if the alignment flat 28 is aligned with the raised surface 34 inside the first end cavity 16. This arrangement serves to mechanically align the transmitting or receiving unit or subassembly 20 in a predetermined annular or rotational angular position. As a result of this predetermined positioning, electrical leads 64, which extend from the transmitting or receiving unit or subassembly, extend in a predetermined direction—for example, for ease of assembly or connection to a printed circuit board or other device or circuit.

The distal bore 32 of first end cavity 16 includes a radially inwardly extending annular shoulder 38 at the distal end of the bore. The shoulder 38 is located to engage against the distal end of the extension 24 of the transmitting or receiving optical unit or subassembly 20. Thus, when the transmitting or receiving optical unit or subassembly 20 is inserted into the housing and engaged against the annular shoulder 38, it is in a predetermined and fixed axial position within the housing. More specifically, the first end cavity 16 is preferably, but not exclusively, configured in accordance with standard ITA-604-3 of the Telecommunication Industry Association for type SC ("S"ubscriber "C"connectors), which standard is hereby incorporated by reference.

To retain the first optical fiber network element, such as the transmitting or receiving optical unit or subassembly 20, in the aligned position within the first end cavity 16 of connector housing 12, the connector housing may include at least one and, more preferably, a pair of opposed slots 40 in the side of the connector housing between flange 42 and slot surface 44. The slots 40 in the connector housing 12 are located in the connector housing so that the axial position of the slots are in registration with an annular groove or slot in the first optical fiber network element (illustrated as groove or slot 26 in an optical transmitting or receiving unit or subassembly 20) when the first optical fiber network element is fully inserted into the desired position in the connector housing. The retaining member 14 is inserted into the slot 40 in the connector housing and into the slot 26 of the first optical fiber network element, such as the transmitting or receiving optical unit or subassembly 20, so as to secure the first optical fiber network element in the desired position within the connector housing 12.

Figure 3:
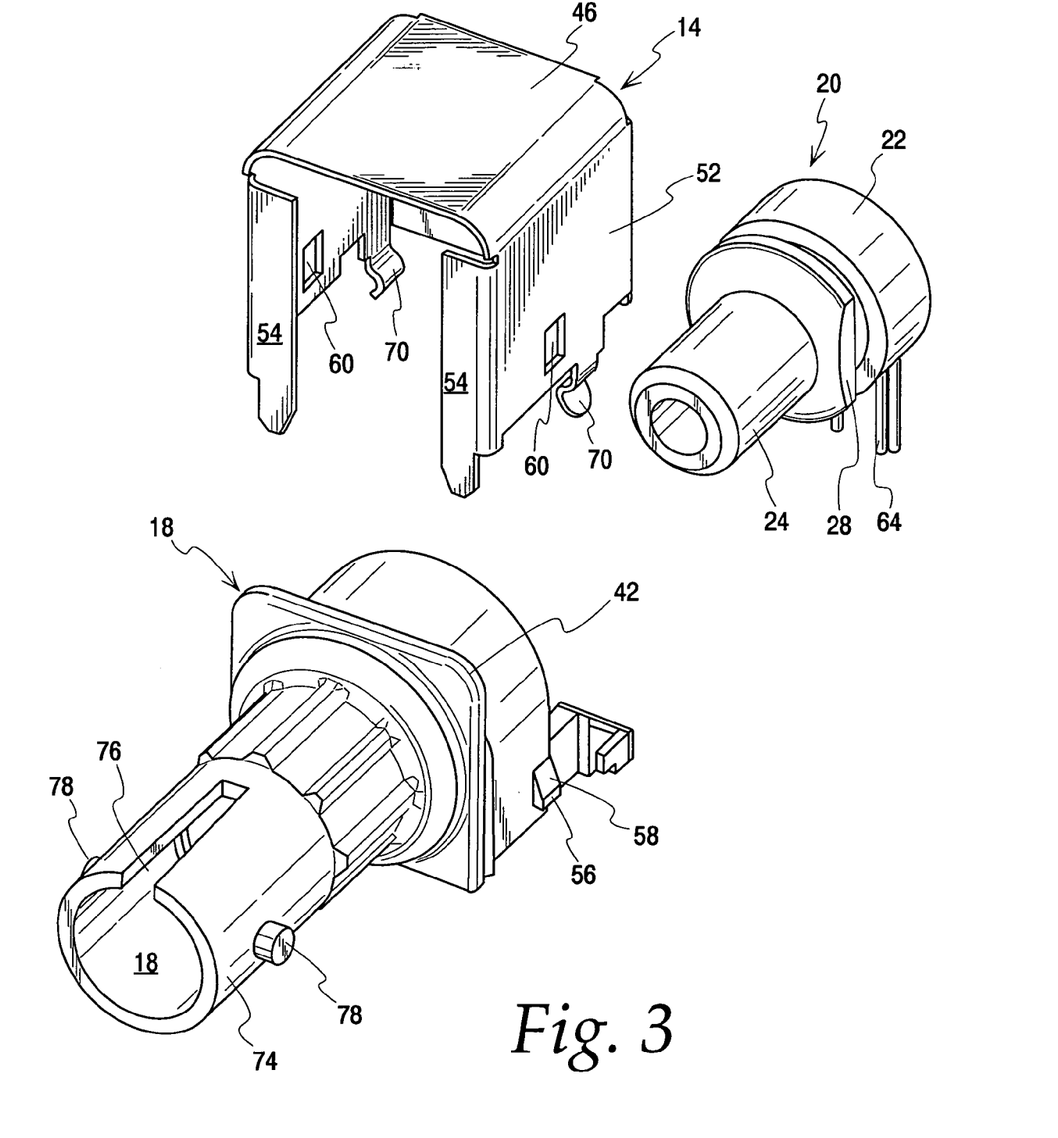
FIG. 3 is an exploded perspective view of the fiber optic connector of FIG. 2, taken from a different viewing direction.

More specifically, as best seen in FIGS. 2 and 3, the retaining member 14 is preferably, but not necessarily, in the form of a generally rectangular, hollow, bent metal or plastic shield, having top wall 46, end wall 48 and side walls 50 and 52. The retaining member 14 has a generally open front or distal end that is flanked by a pair of inwardly extending side flanges 54. The flanges 54 are sized and positioned to slide into the slots 40 in the connector housing 12 after the first optical fiber network element, such as the transmitting or receiving optical unit or subassembly 20, has been inserted. The flanges 54 extend through the slots 40 of the connector housing and through the annular groove or slot 26 of the optical subassembly 20, capturing the subassembly or unit in a fixed axial position within first end cavity 16 of the connector housing 12.

To hold the retaining member 14 in position on the connector housing 12, the connector housing includes a raised detent 56 on each side of the connector housing. The detent includes an inclined upper surface 58 that allows the side wall of the retaining member to slide over the detent 56, until the detent is captured in a locking aperture 60 located in each side wall 50, 52 of the retaining member 14.

Figure 5:
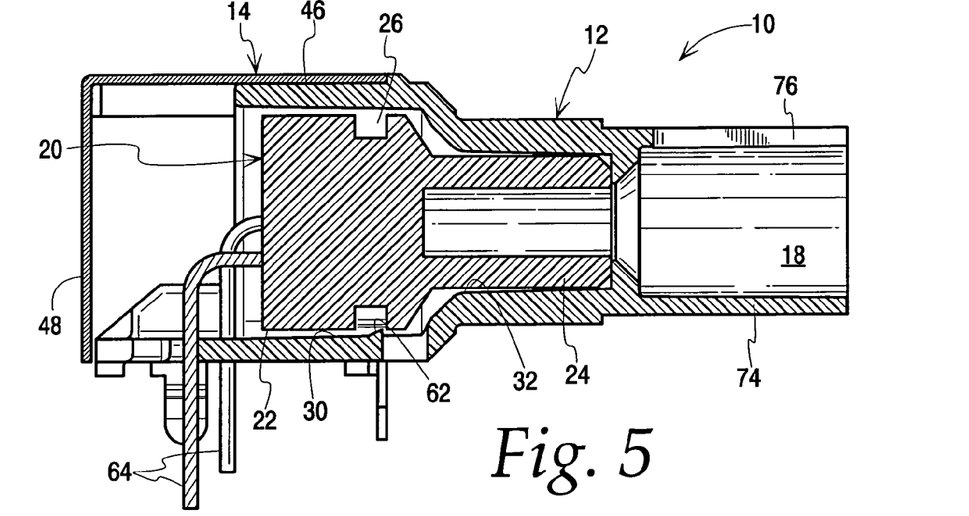
FIG. 5 is a cross-sectional view of the fiber optic connector of FIGS. 1 and 2, taken along lines 5—5 of FIG. 2.

The connector housing 12 includes a further feature that also aids in retaining the transmitting or receiving optical unit or subassembly 20 (or other fiber optical network element) in the desired axial position. As best seen in FIG. 5, the interior surface of the bore 30 in first end cavity 16 has a raised lip or catch 62 on the bottom wall. When the transmitting or receiving optical unit or subassembly 20 is inserted to the proper axial position, the raised lip extends or snaps into the annular slot or groove 26 of the transmitting or receiving optical unit or subassembly and retains it against inadvertent withdrawal from the connector housing 12.

When the transmitting or receiving optical unit or subassembly 20 is fully inserted into the connector housing 12, and the retaining member 14 attached, it may be seen that the end wall 48 of the retaining member substantially fully closes the opening into the first end cavity 16. To allow the electrical leads 64 of the optical transmitting or receiving unit or subassembly 20 (or other optical fiber network element) to exit from the connector housing 12, the connector housing has one or more slots 66 located in a bottom wall. The electrical leads 64 may extend through the slots for attachment to a printed circuit board or other electronic fixture, circuit or device. Of course, either or both of the fiber optic network elements joined by the connector housing 12 may be part of a larger fiber optic network and, it is not required that the connector be attached to a printed circuit board, or other device or circuit.

On the other hand, fiber optic connector assemblies are often mounted directly to printed circuit boards 11 or the like, as shown in FIG. 1. In accordance with another aspect of the present invention, the retaining member 14 includes a pair of extending members or feet 70 particularly suitable for insertion into mounting holes or apertures in a printed circuit board or the like. In the illustrated device, the extending members are in the form of depending feet or extensions from the side walls 50 and 52 of the retaining member. Preferably, the feet are curved or bent inwardly in order to provide convenient snap attachment into the mounting holes of the printed circuit board 11.

In the illustrated embodiment, the retaining member 14 is shown as a formed or bent metal or plastic housing. However, it should be appreciated that other forms of retaining members may be employed without departing from the present invention. For example, the retaining member may be in a form of a U-shaped wire or fastener, such as a staple-shape, that could also have spaced-apart legs for insertion into the opposed slots 40 of the connector housing 12 and into the annular groove or slot 26 of the transmitting or receiving optical unit or subassembly 20 (or other optical fiber network element).

Turning now to the other end of the illustrated connector assembly, the second end cavity 18 of the connector housing 12 may be configured in any desired fashion to connect to another optical fiber network member, such as an optical fiber or fiber connector. In the illustrated embodiment, the connector housing 12 has a generally hollow cylindrical sleeve or extension 74 that forms the second end cavity 18 for receiving an ST ("S"traight "T"ip) type optical fiber connector. For this application, the second end cavity 18 may conform to the standards of the Telecommunications Industry Association. For a type ST connector, this end of the connector housing 12 is designed in accordance with and to meet the requirements of Telecommunications Industry Association standard TIA/EIA 604, fiber optic connector intermateability standard, which is hereby incorporated by reference.

More particularly, for a type ST fiber optic connector the cylindrical sleeve 74 includes an axially extending slot 76 that extends substantially the length of the sleeve. The cylindrical sleeve also has a pair of external opposed bosses or raised members 78 that define a twist-lock or bayonet-lock arrangement standard on a type ST connector assembly for connecting an optical fiber.

Figure 4:
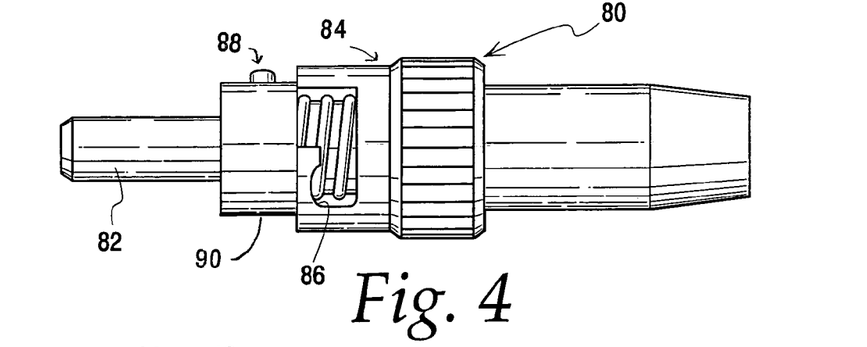
FIG. 4 is a side view of another optical fiber network element in the form of an optical fiber connector that may be used with the present invention.
Figure 6:
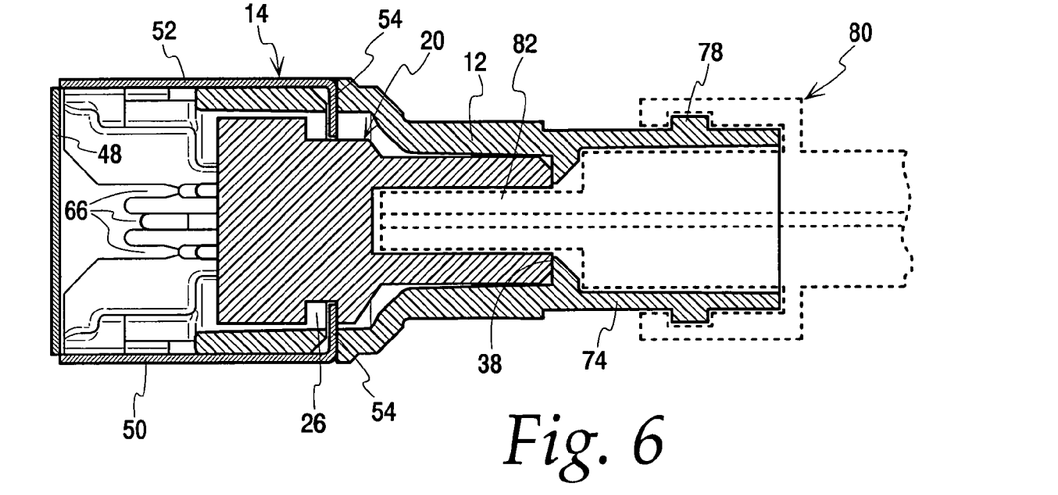
FIG. 6 is a cross-sectional view of the fiber optic connector of FIGS. 1 and 2, taken along lines 6—6 of FIG. 2, and showing two optical fiber network elements, a transmitting or receiving optical subassembly or unit and a optical fiber connector (in phantom), joined in the connector of the present invention.
Figure 7A:
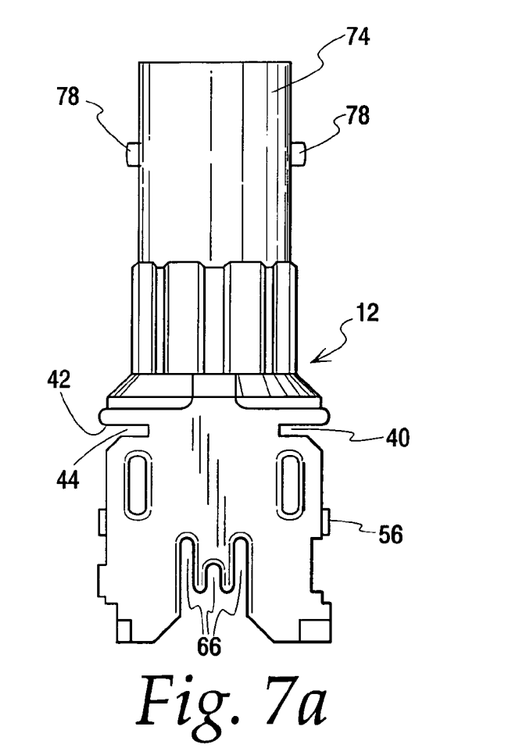
FIGS. 7A–7D are top, side and end views of the fiber optic connector housing of present invention.
Figure 7B:
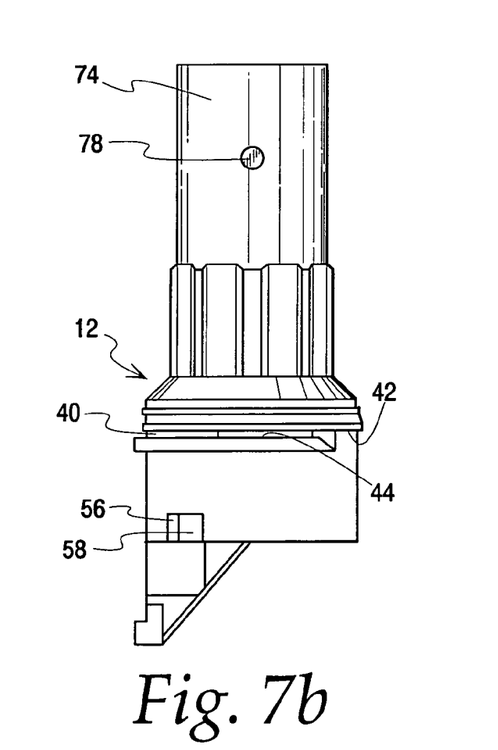
Figure 7C:
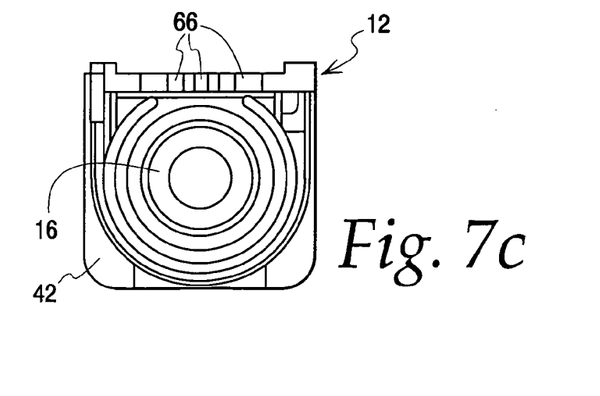
Figure 7D:
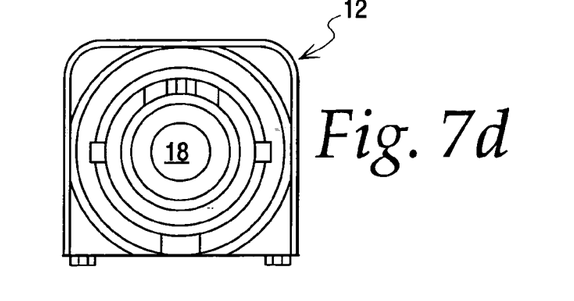

A typical ST type connector 80 is illustrated in FIG. 4. As seen there the connector holds an optical fiber 81 in ferrule 82 and includes a twist-lock sleeve 84 with an twist-lock slot 86 for attaching to the bosses 78 on the connector housing when the connector 80 is inserted into the second end cavity 18 of connector housing 12. A raised boss 88 on intermediate sleeve 90 of the connector 80 is received in the slot 76 of the connector housing sleeve 74. The result (as illustrated in FIG. 6) is optically aligned and secure connection of first and second optical fiber elements (e.g. optical fiber connector 80 and transmitting or receiving optical unit or subassembly 20).

Although the present is illustrated in the form of one or more embodiments, it is understood that present invention is not limited to the embodiments set forth in the above description, but is defined as set forth in the pending claims and equivalents thereof.

The invention claimed is:

1. A fiber optic connector comprising:
a rigid connector housing having a top and including a first cavity for receiving a first optical fiber network member at a first end and a second cavity for receiving a second optical fiber network member at a second end, wherein the first end is situated axially opposed to the second end, the first and second cavities being disposed in the housing to optically align the first and second optical fiber network members; and
a retaining member adapted for operative engagement with the rigid connector housing and with the first optical fiber network member to retain the first optical fiber network member at a selected axial location within the rigid connector housing, the retaining member further having a plurality of extending feet adapted for perpendicular attachment to a printed circuit board, wherein the top of the rigid connector housing is covered by the retaining member thereby substantially closing the first cavity when engaged with the rigid connector housing.

2. A fiber optic connector in accordance with claim 1 in which the first optical fiber network member comprises a transmitting or receiving optical unit and the second optical fiber network member comprises an optic fiber connector.

3. The connector of claim 1 in which the rigid connector housing is configured to axially align the first and second optical fiber network members.

4. The connector of claim 3 in which the first cavity is configured to allow insertion of the first optical fiber network member into the first cavity and to retain it in the first cavity in a selected rotational position.

5. The connector of claim 4 in which the first cavity includes an alignment surface that allows insertion of the first optical fiber network member into the cavity only in the selected rotational position.

6. The connector of claim 3 wherein the first cavity includes an internal shoulder positioned to engage the first optical fiber network member when the first optical fiber network member is located at a desired axial position in the first cavity.

7. The connector of claim 1 in which the rigid connector housing includes at least one slot and the retaining member is adapted for insertion into the slot to engage a surface of the first optical fiber network member within the first cavity to retain it within the rigid connector housing.

8. The connector of claim 1 wherein the rigid connector housing includes a pair of slots disposed on opposite sides of the first cavity and the retaining member comprises a pair of spaced-apart legs adapted to be received in the slots and to retain the first optical fiber network member inserted therein.

9. A fiber optic connector in accordance with claim 1 in which the first optical fiber network member includes an annular slot intermediate the opposed ends of the first optical fiber network member, and wherein said rigid connector housing includes a housing slot adapted to be in registration with the annular slot when the first optical fiber network member is axially positioned in the first cavity, and said retaining member is adapted for insertion into said rigid connector housing slot and into the annular slot of the first optical fiber network member.

10. The connector of claim 1 in which the second cavity of the rigid connector housing is adapted to receive a fiber optic connector.

11. The connector of claim 9 in which the rigid connector housing includes a pair of opposed projections for cooperation with a fiber optic connector having a twist-lock or bayonet-lock type connection.

12. The connector of claim 10 in which the second cavity is configured to couple with a type ST fiber optic connector.

13. The connector of claim 1 in which the first cavity is adapted to receive a transmitting or receiving unit of the type including an optical transmitting or receiving means at one end and one or more electrical leads at the other end.

14. The connector of claim 13 in which the first cavity is configured to couple with a type SC fiber optic connector.

15. The connector of claim 13 wherein the rigid connector housing includes at least one lead slot for allowing an electrical lead to exit from said first cavity.

16. The connector of claim 1 further comprising a first fiber optic network element received in the first cavity and a second fiber optic network element received in the second cavity.

17. A fiber optic connector comprising:
a rigid connector housing including a first cavity for receiving a first optical fiber network member, and a second cavity for receiving a second optical fiber network member, the first and second cavities being disposed in the housing to optically align the first and second optical fiber network members, the first optical fiber network member including an annular slot intermediate the opposed ends of the first optical fiber network member, the rigid connector housing including a housing slot adapted to be in registration with the annular slot when the first optical fiber network member is axially positioned in the first cavity; and a retaining member adapted for operative engagement with the rigid connector housing and with the first optical fiber network member to retain the first optical fiber network member at a selected axial location within the rigid connector housing, the retaining member further having a plurality of extending feet adapted for attachment to a printed circuit board, the retaining member substantially closing the first cavity when engaged with the rigid connector housing, the retaining member adapted for insertion into said rigid connector housing slot and into the annular slot of the first optical fiber network member.

18. A fiber optic connector comprising:

a rigid connector housing including a first cavity for receiving a first optical fiber network member, and a second cavity for receiving a second optical fiber network member, the first and second cavities being disposed in the housing to optically align the first and second optical fiber network members, the first optical fiber network member including an annular slot intermediate the opposed ends of the first optical fiber network member, the rigid connector housing including a housing slot adapted to be in registration with the annular slot when the first optical fiber network member is axially positioned in the first cavity, the rigid connector housing further includes a pair of opposed projections for cooperation with a fiber optic connector having a twist-lock or bayonet-lock type connection; and a retaining member adapted for operative engagement with the rigid connector housing and with the first optical fiber network member to retain the first optical fiber network member at a selected axial location within the rigid connector housing, the retaining member further having a plurality of extending feet adapted for attachment to a printed circuit board, the retaining member substantially closing the first cavity when engaged with the rigid connector housing, the retaining member adapted for insertion into said rigid connector housing slot and into the annular slot of the first optical fiber network member.

* * * * *